INVENTORS.
EDWARD P. BULLARD III
ARTHUR A. TOMENCEAK
ATTORNEY.

Jan. 30, 1968     E. P. BULLARD III, ETAL     3,365,989
MULTIPLE TURRET HEAD INDEXING APPARATUS
Filed June 16, 1967                                         4 Sheets-Sheet 2

INVENTORS.
EDWARD P. BULLARD III
ARTHUR A. TOMENCEAK
BY
John H. Midney
ATTORNEY.

INVENTORS.
EDWARD P. BULLARD III
ARTHUR A. TOMENCEAK
BY John H. Midney
ATTORNEY.

United States Patent Office 3,365,989
Patented Jan. 30, 1968

3,365,989
MULTIPLE TURRET HEAD INDEXING
APPARATUS
Edward P. Bullard III and Arthur A. Tomenceak, Fairfield, Conn., assignors to The Bullard Company, Bridgeport, Conn., a corporation of Connecticut
Filed June 16, 1967, Ser. No. 646,595
10 Claims. (Cl. 82—3)

ABSTRACT OF THE DISCLOSURE

A turret head device for indexing from station to station in unison multiple turret heads of a multiple spindle machine tool in which movement of a single rack from a normally disengaged position into driving engagement with the turret heads to commence an indexing cycle initiates and controls the subsequent indexing action and prevents further operation of the machine tool until an indexing cycle is properly accomplished. Upon being moved into driving engagement with the turret heads, the rack is simultaneously locked in the engaged position and actuates a valve causing pressurized hydraulic fluid to flow to two piston-cylinder arrangements, one of which is operably connected to a turret head locking mechanism and unlocks the turret heads so that they may be rotatably indexed, and the other of which reciprocates the rack to rotate the turret heads one index station. Switches respectively operated by the piston-cylinder arrangement connected to the turret head locking mechanism, and by the rack prevent operation of the machine tool unless and until an indexing operation is satisfactorily completed, the turret heads are in the locked position, and the rack is returned to the normal disengaged position.

---

The present invention relates to turret heads for machine tools and has particular reference to apparatus for automatically indexing in unison and accurately positioning at various index stations multiple turret heads mounted on a slide of a multiple spindle metal-turning machine.

Automatically controlled machine tools for accomplishing a series of metal-cutting operations, such as turning, facing, boring, etc., in succession on a workpiece in accordance with a programmed cycle require a number of different types of cutting tools for performing the various machining operations. The multiple spindle turning machines designed for such operation heretofore available of the type having the work spindles mounted for rotation about a vertical axis have generally employed a variety of tools in identical sets for each spindle mounted directly on a slide or platen which is universally movable in a vertical plane. The slide or platen is automatically moved along a predetermined path by a program control to sequentially position and move the respective tools relative to their corresponding workpieces for performing the desired identical machining operations on each workpiece in the programmed order.

With this type of tooling and where the machining operations require one or more tools such as boring bars which may be relatively lengthy, difficulty is often encountered in programming the path of movement of the slide for performing the desired operations while at the same time insuring that during the movement of the slide, the nonfunctioning tools do not interfere with the workpiece. In order to overcome this problem, retractable tool supports have been employed for moving potentially interfering tools away from the workpiece when not in use. However, since retractable tool supports require that the member carrying the cutting element be reciprocably or pivotally movable, supports of this type heretofore available have presented problems with regard to rigidly locating and holding the movable member in its operative position so that close tolerances and fine surface finishes can be repeatedly maintained. The variations in tool position encountered with retractable tool supports are particularly troublesome with multiple spindle machines designed to perform identical machining operations simultaneously on a number of workpieces in which case there is often considerable production time lost as a result of the difficulty of maintaining the adjustment of corresponding tools in identical positions relative to the slide in order to meet close tolerance requirements of the workpieces. Moreover, the retractable tool supports heretofore available have been subject to malfunction due to metal chips entering between the movable and stationary members and becoming deposited upon guiding and locking surfaces, thereby preventing the proper positioning and locking of the movable tool support member in the operative position.

Accordingly, an object of the present invention is to provide tool mounting apparatus for a movable slide of a multiple spindle machine tool which simultaneously positions identical tools relative to each work spindle so that identical machining operations can be performed on workpieces supported at each of the respective machine spindles.

Other objects include the provision of such tool mounting apparatus which supports a plurality of sets of tools for each work spindle with all but one tool of each set being maintained in a non-interfering position relative to the workpieces; which positively and reliably indexes corresponding tools of each set into operative position in unison; which accurately and uniformly positions corresponding tools of each set in the operative position relative to the machine tool slide; which prevents any further movement of the machine tool slide once an indexing cycle has commenced unless and until the indexing cycle is fully completed; and in which movement of a single member initiates and controls the subsequent indexing action and prevents further operation of the machine tool until an indexing cycle is properly accomplished.

The above objects are accomplished in the present invention by providing a machine tool slide having a plurality of turret head supports extending therefrom in parallel relation rotatably mounting identically constructed turret heads having tool-holding faces to which are secured identical sets of tooling identically disposed relative to the head supports. The turret heads are axially movable on the supports, whereby in an outward position they are unlocked from the slide so that they may be rotatably indexed, and in an inward position are keyed to the slide at predetermined index stations, in each of which a tool is held in the operative position. The multiple turret heads are gear-connected to each other and are indexed in unison from station to station by a single rack member mounted for pivotal and reciprocable movements relative to the turret heads and normally positioned out of driving engagement with the turret head gear connections. Each indexing cycle is initiated by pivotally moving the rack into driving engagement with the turret heads by means of a hydraulic operator. Immediately upon being moved from the normal disengaged position, the rack actuates a first switch connected to the program control mechanism which prevents any further movement of the machine tool slide. The rack then simultaneously becomes locked in the engaged position and actuates a control valve connecting a source of pressurized hydraulic fluid to first and second piston-cylinder arrangements which respectively moves the turret heads outwardly on their supports to unlock the heads from the slide and reciprocates the rack to rotatably index the turret heads to the next station. Upon the rack being fully reciprocated to completely index the turret heads to the new station, cooperatively acting surfaces on the rack and control valve cause the valve to connect the piston-cylinder arrangements to an exhaust reservoir, whereupon the first piston-cylinder arrangement immediately returns the turret heads to the locked position on their respective supports. The rack, however, is prevented by the cooperatively acting surfaces from returning to the unreciprocated position until the turret heads are fully returned to the locked position, thereby actuating a second switch operatively connected to the hydraulic operator which causes the rack to be oscillated out of driving engagement with the gear connections of the turret heads, resulting in disengagement of the cooperatively acting surfaces of the rack and control valve. The second piston-cylinder arrangement thereupon moves the disengaged rack to the normal unreciprocated position. Upon arriving at the normal position, the rack actuates the first switch associated therewith, permitting the program control to again function and continue the programmed movement of the slide to perform the subsequent machining operations.

Numerous other objects and advantages of the invention will become apparent as it is better understood from the following description which, taken in connection with the accompanying drawings, discloses a preferred embodiment thereof.

Referring to the drawings:

FIG. 2 is a front elevational view partly in section and partly in schematic form of the slide, turret heads and turret head indexing apparatus for the twin spindle machine tool of FIG. 1;

FIG. 4 is an enlarged sectional view taken substantially along the line 4—4 of FIG. 2;

Figure 1:
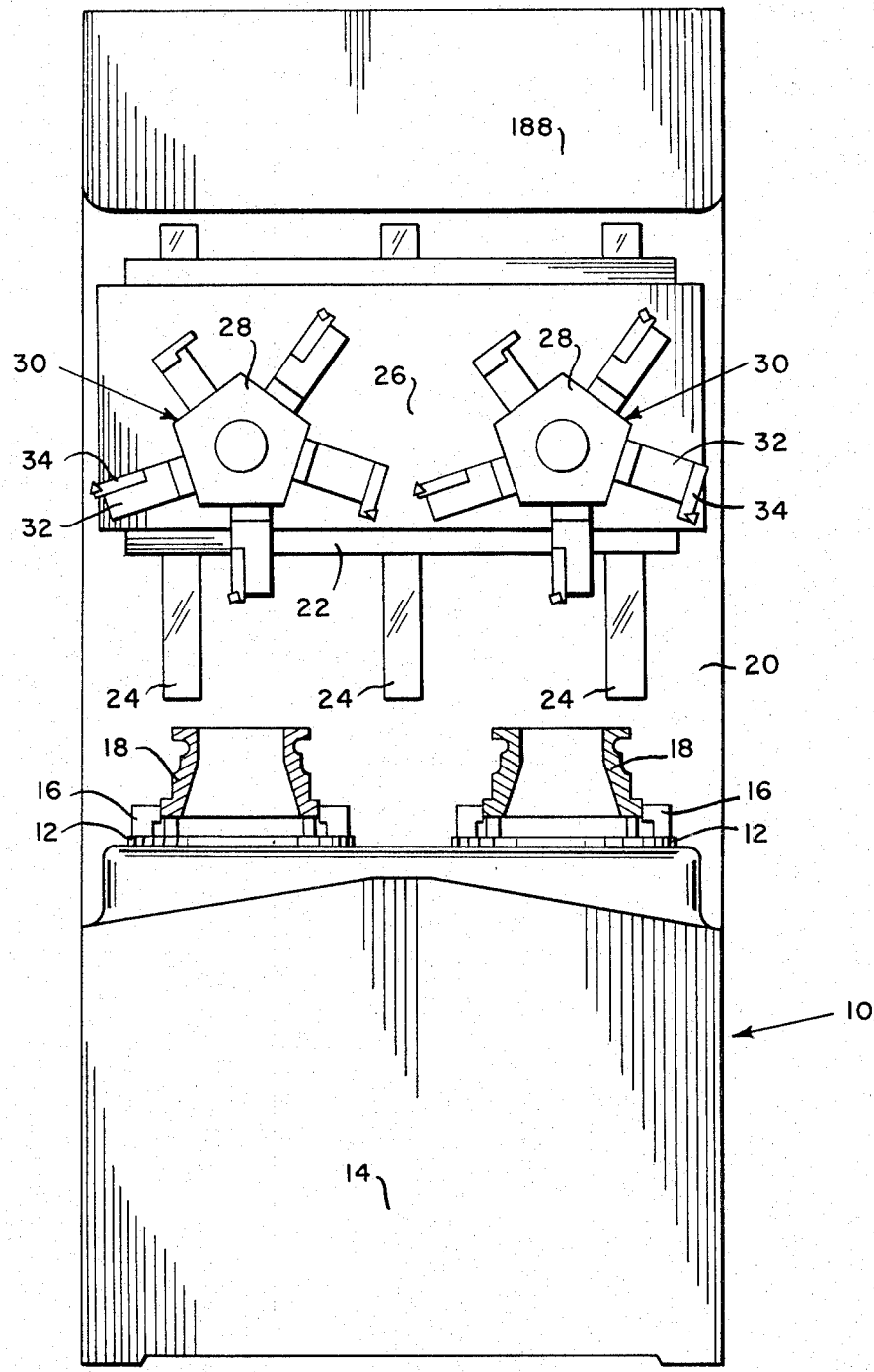
FIG. 1 is a front elevational view of a machine tool having two vertically disposed work spindles and a slide mounting two turret heads operated by turret indexing apparatus to which the principles of the present invention have been applied.

As a preferred or exemplary embodiment of the instant invention, FIG. 1 shows a vertical chucking machine tool generally designated 10 having two work-supporting tables 12 rotatably mounted on a base 14 for rotation about parallel vertical axes by a conventional headstock transmission (not shown). The tables 12 have mounted thereon work-holding fixtures 16 which rigidly hold and support workpieces 18 upon which identical turning, facing and boring operations are to be performed in a predetermined sequence of operations.

The base 14 has an integrally connected column 20 extending upwardly behind the work tables 12 and supporting a saddle 22 mounted on ways 24 for vertical movement therealong. A cross slide 26 is mounted for horizontal movement relative to the saddle 22 along ways (not shown) provided on the saddle.

Pentagon-shaped turret heads 28, each having five tool-supporting faces 30, are mounted on the slide 26 and are capable of being rotatably indexed, as will be hereinafter described, so as to sequentially move each face into an operative position in which it lies in a horizontal plane. The surfaces of the faces 30 are accurately machined to a precise identical dimension from the centerlines of rotation of the turret heads 28.

The faces 30 of each turret head 28 have secured thereto various toolholders 32 having cutting tools 34 mounted thereon, each cutting tool being designed to accomplish a different type of machining operation on the workpiece. Corresponding faces 30 of the respective turret heads 28 are provided with substantially identical toolholders 32 and cutting tools 34, with the cutting edges of corresponding tools being precisely and identically positioned relative to the centerlines of rotation of the respective turret heads 28.

Figure 3:
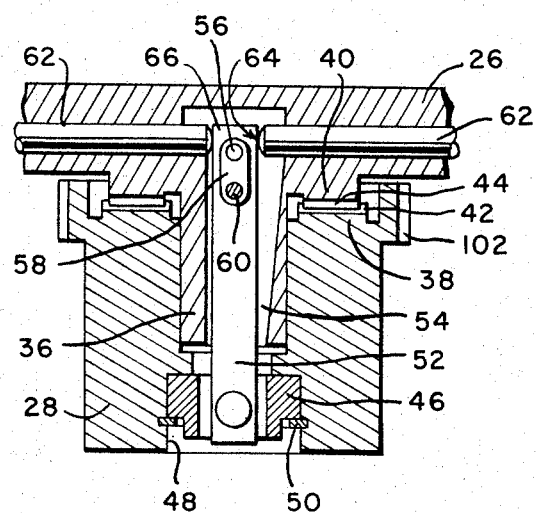
FIG. 3 is an enlarged sectional view of a turret head taken substantially along the line 3—3 of FIG. 2.

Hollow shafts 36 integral with and extending outwardly from the slide 26 rotatably support the turret heads 28 on the slide (FIG. 3). The opposed surfaces of the turret heads 28 and slide 26 are provided with annular portions 38 and 40, respectively, each having spaced, wedge-shaped projections 42 and recesses 44, with the adjacent recesses and projections of each annular portion having common end walls which are beveled and radially disposed. The recesses 44 of the respective annular portions 38 and 40 are dimensioned so as to receive the projections 42 of the other in mating engagement, with the respective end walls of the mating recesses and projections in close fitting contact. Also, the annular portions 38 and 40 have their respective projections 42 and recesses 44 precisely located for mating engagement when each face 30 of the turret head 28 is positioned in its operative position.

The turret heads 28 are axially movable outwardly on their respective shafts 36 to separate the annular portions 38 and 40 to permit the turret heads to be indexed, and inwardly to re-engage the annular portions and lock the turret heads to the slide 26 when indexing is completed. This axial movement is effected by means of a cylindrical collar 46 positioned in a cylindrical recess 48 in the turret head 28 and retained therein by a retainer ring 50. A bar 52 pivotally connected at one end to the collar 46 extends through a passage 54 in the shaft 36. The other end of the bar 52 is connected by a pivot pin 56 to a toggle link 58. The link 58 is also pivotally connected to a pin 60 affixed to the shaft 36 with the pin 60 being located between the pivotal connections of the bar 52 to the collar 46 and link 58, respectively. The centerline of the pin 60 is substantially perpendicular to and intersects the centerline of shaft 36.

Rods 62 reciprocably mounted in the slide 26 have end surfaces 64 adapted to abut against opposed surfaces of inner end portions 66 of the bars 52 and maintain the bars in precise parallel alignment. Cylinders 68 and 70 mounted on the slide 26 have pistons 72 and 74, respectively, reciprocably disposed therein and adapted to engage end surfaces 76 and 78, respectively, of the immediately adjacent rods 62. Constant pressure fluid admitted at all times through a line 80 into cylinder 68 continuously urges the piston 72, rods 62, and bars 52 in the leftward direction, as viewed in FIGS. 2 and 3.

The cylinder 70 is connected by a passage 82 to a spool valve 84 mounted on the slide 26. The valve 84 includes an axially movable spool 86 having an end portion 88 disposed in a bore which communicates with a passage 90 connected to a source of constant pressure fluid, whereby the pressure fluid acting upon the spool end portion continuously urges the spool vertically upwardly against a stop 92. In the upward position, the spool 86 connects the passage 82 to an exhaust line 94 so that the pressure fluid acting upon the piston 72 forces the rods 62, bars 52, and piston 74 leftwardly to a limiting position, as shown in FIGS. 2 and 3, wherein the piston 74 abuts an adjustable stop 96 which threadingly engages the housing of and extends into cylinder 70.

The adjustable stop 96 is provided with a lock nut 98 for maintaining the position of the stop relative to the cylinder 70 in a pre-adjusted location such that in the limiting position of the rods 62 and bars 52, the centerlines of the pivot pins 56 are forced slightly to the left of the centerlines of the respective shafts 36, as viewed in FIG. 3. In this position, the bars 52 forcibly draw the turret heads 28 inwardly on the shafts 36 to engage the annular portions 38 and 40 and, by virtue of the relative positions of the pivot connections 56 and 60, the toggle links 58 effect a positive locking of the turret heads to the slide 26. To unlock the turret heads 28, the bars 52 must first be forced rightwardly, as viewed in FIG. 3, with sufficient force to move the pivot pins 56 past the centerline of the respective shafts 36. Further oscillatory movement of the bars 52 causes the bars to be displaced axially of the shafts 36, thereby moving the turret heads outwardly and disengaging the annular portions 38 and 40 so that the turret heads may be rotatably indexed. The rightward movement of the bars 52 is accomplished by movement of the spool 86 of the valve 84 to a downward position wherein the spool causes the passage 82 to be connected to the passage 90 carrying the constant pressure fluid. By virtue of a greater effective area of the piston 74 relative to the piston 72, the force of the pressurized fluid constantly acting on the piston 72 is overcome by the pressurized fluid admitted into the cylinder 70 and acting upon the piston 74, and the piston 72, rods 62 and bars 52 are forced rightwardly, resulting in the unlocking of the turret heads 28 from the slide 26 in the manner hereinbefore described.

A spur gear 100 rotatably journaled in the slide 26 is in constant meshing engagement with gear teeth 102 integrally formed on peripheral portions of the turret heads 28. A pinion 104 keyed to gear 100 for rotation therewith is adapted to be engaged by a rack member 106. The rack 106 has a portion 108 slidingly mounted in a pivotable member 110 journaled in the slide 26 (FIG. 4) whereby the rack is both pivotally and reciprocably movable relative to the slide.

A pin 112 disposed in an elongated hole 114 provided in the end of the rack 106 adjacent the member 110 pivotally connects the rack to one end of a lever 116. The other end of the lever 116 is disposed within a slot 118 formed in the housing of cylinder 68 and is pivotally connected thereto by a pin 120. An elongated hole 122 provided in the lever 116 intermediate its ends engages a pin 124 to pivotally connect the lever to a piston rod 126 attached to a piston 128 disposed within a cylinder 130 formed in the slide 26.

The head end of the cylinder 130 is connected by a line 132 to the passage 82 which, when the spool is in the upward position, is connected to exhaust line 94 as hereinbefore described. Constant pressure fluid admitted at all times through a line 134 into the rod end of the cylinder 130 continuously urges the piston 128 in the leftward direction, as viewed in FIG. 2, thereby continuously urging the level 116 in the counterclockwise, and the rack 106 in the leftward, directions toward a limiting position wherein an adjustable screw 136 threadably engaging an extended portion 138 of the lever 116 abuts a side surface of the slide 26. A lock nut 140 is provided for maintaining the position of the screw 132 in a pre-adjusted location for purposes to be subsequently described.

Figure 6:
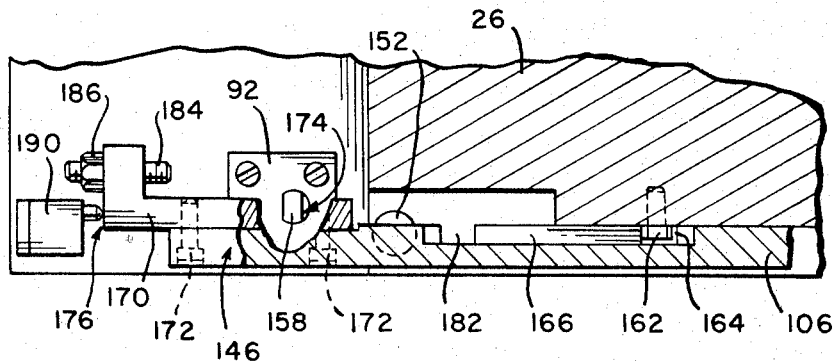
FIG. 6 is a sectional view taken substantially along the line 6—6 of FIG. 5.
Figure 5:
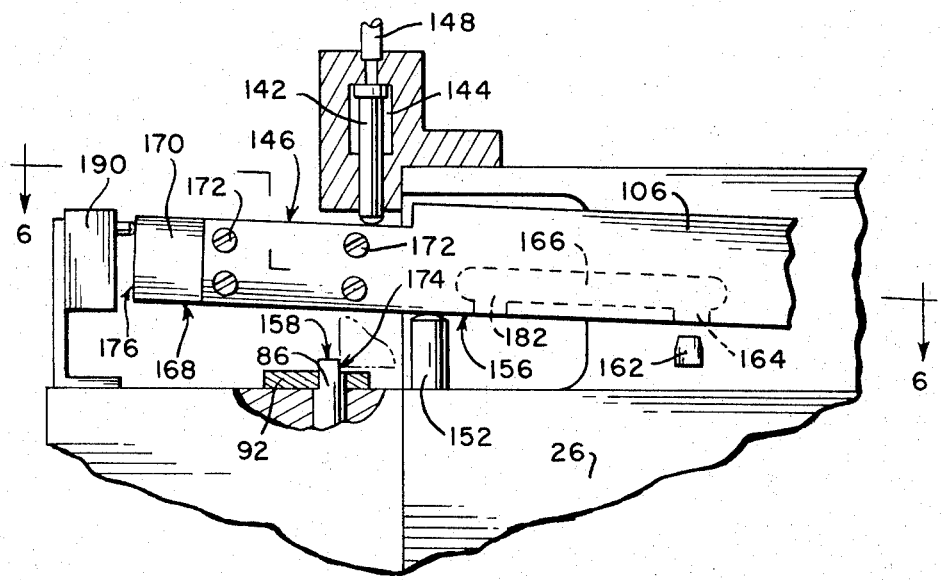
FIG. 5 is an enlarged partial elevational view of a portion of the rack member and the mechanism for positioning the same.

Referring to FIGS. 2, 5 and 6, a rod 142 extending downwardly from a cylinder 144 mounted on the slide 26 abuts against an upper surface 146 of the rack 106 adjacent the end thereof remote from the pivotable member 110. The cylinder 144 is connected by a line 148 to a normally de-energized solenoid valve 150 which in the de-energized condition connects the line 148 to an exhaust reservoir. A pin 152 slidingly mounted in a vertical hole in the slide 26 and urged upwardly by a compression spring 154 continually bears against an undersurface 156 of the rack, pivotally biasing the rack in the clockwise direction. In the normal de-energized condition of the solenoid valve 150, the rack 106 is pivotally moved upwardly by the pin 152, with the rack in abutment with the rod 142, to a limiting position wherein an enlarged upper portion of the rod 142 abuts the upper end wall of the cylinder 144, in which limiting position the rack is out of engagement with the pinion 104 and also spaced from an upper surface 158 of the valve spool 86. Since the spool 86 will be thus maintained in its upward position, thereby connecting the head end of the cylinder 130 to exhaust, the piston 128 moves the lever 116 and rack 106 to the leftward limiting position, as shown in FIG. 2, wherein the screw 136 abuts the slide 26. This limit position of the rack 106 may be adjusted by adjustment of the screw 136 to position the teeth of the gear relative to the teeth of the pinion 104 for smooth meshing engagement when the rack is pivotally moved clockwise, as viewed in FIG. 2, to initiate an indexing cycle.

The turret heads 28 are indexed at predetermined times in a cycle of operations by the energization of the solenoid valve 150, permitting pressurized fluid to flow from a line 160 into cylinder 144. The force of the pressurized fluid acting upon the rod 142 exceeds the force of the spring 154 and the rack is accordingly pivotally moved in the counterclockwise direction into meshing engagement with the pinion 104. As the rack 106 is so moved, a locking member 162 mounted on the slide 26 enters through an opening 164 into a longitudinally extending slot 166 formed in the rack. Also, an undersurface 168 of a member 170 adjustably secured to the rack 106 by screws 172 engages the upper surface 158 of the valve spool 86 and moves the spool downwardly to a position in which the passage 82 is connected to passage 90, thereby admitting the pressurized fluid into cylinder 70 and the head end of cylinder 130. The turret heads 28 are thereupon unlocked from the slide 26 by movement of the piston 74 in the cylinder 70 in the manner previously described. The pressurized fluid acting upon the piston 128 then pivotally moves the lever 116 in the clockwise direction, as viewed in FIG. 2, thereby reciprocably moving the rack 106 rightwardly to rotatably index the turret heads 28 in unison.

During the entire reciprocal movement of the rack 106, the locking member 162 slidingly engages the slot 166 to positively maintain the rack in meshing engagement with the pinion 104. As soon as the rack 106 has been reciprocably moved an amount sufficient to fully index the turret heads 28, the surface 168 of the member 170 passes beyond the upper surface 158 of the valve spool 86 to a position wherein a surface 174 of the spool becomes aligned with an end surface 176 of the member 170, as indicated by the broken lines in FIG. 5, permitting the spool to be moved to the upward position by the constant upward force acting thereon. In this position of the spool 86, the passage 82, and thereby the cylinder 70 and the head end of cylinder 130, are connected to the exhaust line 94, and the pressure fluid continuously being admitted into cylinder 68 and acting upon piston 72 immediately moves the piston to lock the turret heads 28 to the slide 26 in the manner previously described.

The piston 128, however, is prevented from returning the rack 106 to its original position because of abutment of the end surface 176 of the member 170 against the surface 174 of the valve spool 86. When the piston 74 has arrived at its limiting position wherein it abuts the adjustable stop 96, ensuring that the turret heads 28 are fully locked to the slide 26, a rod 178 attached to the piston 74 and extending through the stop 96 actuates a switch 180 mounted on the slide. Actuation of the switch 180 causes the solenoid valve 150 to be de-energized, thereby connecting the cylinder 144 to the exhaust reservoir. The spring-loaded pin 152 thereupon pivotally moves the rack 106 in the clockwise direction upwardly out of meshing engagement with the pinion 104, concurrently moving the surface 176 of the member 170 out of interfering engagement with the surface 174 of valve spool 86, and the pressure fluid continuously being admitted into the rod end of cylinder 130 and acting upon piston 128 causes the rack 106 to be reciprocably moved back to its original position. An opening 182 formed in the rack and leading to the slot 166 permits the locking member 162 to become disengaged from the slot as the rack is pivotally moved upwardly.

The openings 164 and 182 are longitudinally spaced so as to permit pivotal movement of the rack 106 relative to the pinion 104 only when the turret heads 28 are properly positioned at an index station. The member 170 is longitudinally adjustable relative to the rack 106 so that the longitudinal position of the surfaces 176 may be adjusted to effect upward movement of the valve spool 86 immediately upon the completion of a full indexing movement of the turret heads 28. An adjustable screw 184 threadably engaging the member 170 is adapted to abut an end surface of the slide 26 and prevent any further reciprocation of the rack 106 when the full indexing movement of the turret heads 28 has been accomplished. A lock nut 186 is provided for maintaining the position of the screw 184 in a desired pre-adjusted location.

Automatic program control apparatus which may be selected from any of the available types well known to those skilled in the art may be used to control the movement of the saddle 22 and cross slide 26 vertically and horizontally, respectively, in either direction at varying rates of movement in accordance with a predetermined programmed cycle. Program control apparatus which is particularly suitable for use with a vertical chucking machine of the type described is disclosed in U.S. Patent No. 3,238,621, issued Mar. 8, 1966, to E. P. Bullard III, entitled, "Program Control." This apparatus employs a rotatably mounted, composite template having a number of precisely formed template surfaces which, together with an associated servo and hydraulic system, accurately moves a cross slide of a machine tool having cutting tools mounted thereon to perform a cycle of machining operations in a predetermined order and manner governed by the contours of the component surfaces of the composite template. In the machine tool 10 of FIG. 1, program control apparatus (not shown) of the type disclosed in the referenced patent may be enclosed within a compartment 188 mounted on the upper end of the column 20. As identical tools mounted on corresponding faces 30 of the turret heads 28 are simultaneously indexed in sequence to the operative position, the program control moves the slide 26 along a path at a rate such that identical machining operations are simultaneously performed by the tools 34 on the workpieces 18 held in the respective fixtures 16.

Indexing of the turret heads 28 at predetermined points in the cycle of operations may be effected through control elements (not shown) synchronized and cooperatively acting with the rotatable composite template of the program control apparatus. To preclude damage to the machine from improperly positioned tools, it is desirable to prevent any movement of the slide 26 while the turret heads 28 are being indexed, and unless and until a turret indexing cycle once initiated is properly completed. This may be automatically accomplished by providing a normally open switch 190 mounted on the slide 26 which is adapted to be engaged and closed by the end surface 176 of the member 170 only when the rack 106 is in its normal disengaged position, as shown in FIG. 2. The switch 190 is electrically connected to the template drive unit so as to interrupt rotary movement of the composite template except when the switch 190 is closed. It will thus be apparent that upon the initiation of an indexing cycle by pivotal movement of the rack 106 into meshing engagement with the pinion 104, movement of the slide 26 by the program control will be interrupted. Moreover, the rack 106, being then locked in meshing engagement with the pinion 104, must continue through and complete an indexing cycle, and the turret heads 28 subsequently returned to the locked position at the new index station, before the rack 106 is permitted to return to its normal disengaged position wherein it actuates and closes switch 190, allowing the template drive unit to rotate the templates and the programmed cycle of operations of the machine to proceed.

Figure 7:
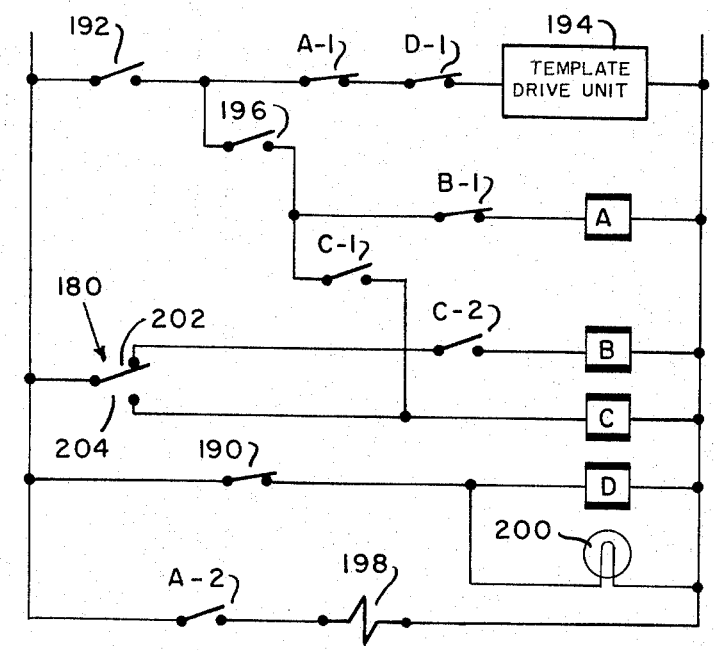
FIG. 7 is a wiring diagram of the electrical components of the turret head indexing apparatus.

Referring to FIG. 7, the electrical components and circuitry used with the turret head indexing apparatus of the present invention will now be described. A switch 192 is manually closed to energize a template drive unit 194 of the program control through normally closed contacts A–1 and D–1 to commence operation of the machine tool 10 through a predetermined machining cycle. At selected points in the operating cycle, a control element operatively associated with the program control closes an automatic turret indexing switch 196 which energizes a relay coil A through normally closed contacts B–1. The energizing of relay coil A opens contacts A–1, stopping the template drive unit 194, and also closes normally open contacts A–2, energizing a solenoid 198. The solenoind 198 actuates the solenoid valve 150 to pivotally move the rack 106 downwardly into meshing engagement with the pinion 104 as hereinbefore described. The downward movement of the rack 106 opens the switch 190, de-energizing an "Index Complete" indicator lamp 200 and also de-energizing a relay coil D which opens contacts D–1. At this time, contacts D–1 and A–1 are both open so that the circuit to the template drive unit 194 is interrupted by both sets of contacts.

Upon the rack 106 being moved into meshing engagement with pinion 104, the valve spool 86 is depressed, resulting in the flow of pressurized fluid into cylinder 70 and the head end of cylinder 130. The fluid flowing into cylinder 70 moves piston 74 and rod 178 rightwardly, as viewed in FIG. 2, to unlock the turret heads 28 from the slide 26 and concurrently actuating switch unit 180, opening the normally open switch contacts 202 and closing the normally closed switch contacts 204. Closing of switch contacts 204 energizes a relay coil C, closing normally open contacts C–1 to complete a holding circuit to relay C, and also closing normally open contacts C–2. Relay coil B is not energized by the closing of contacts C–2 since switch contacts 202 are now open.

With the turret heads 28 unlocked, the pressurized fluid flowing into the head end of cylinder 130 causes rack 106 to be reciprocated, indexing the turret heads to the next index station, whereupon the valve spool 86 moves upwardly connecting cylinder 70 and the head end of cylinder 130 to exhaust. The piston 74 and rod 178 are moved leftwardly, as viewed in FIG. 2, as the turret heads 28 are returned to the locked position, and when the turret heads are fully locked to the slide 26, the rod 178 actuates the switch unit 180 opening the contacts 204 and closing the contacts 202. While the turret heads 28 are being returned to the locked position, reciprocal movement of the rack is prevented by the abutment of the member 170 against the valve spool 86.

Notwithstanding the opening of the switch contacts 204, relay coil C remains energized through closed contacts C–1, and since contacts C–2 also remain closed, relay coil B becomes energized upon closing of the switch contacts 202 which opens B–1 and de-energizes relay coil A. The de-energizing of relay coil A closes contacts A–1 and opens contacts A–2. The circuit to the template drive unit 194 is not, however, completed since contacts D–1 are still open. The opening of contacts A–2 de-energizes solenoid 198 whereupon solenoid valve 150 connects cylinder 144 to exhaust and the rack 106 is pivotally moved to the unmeshed position and reciprocably moved to the normal disengaged position in the manner previously described.

Upon the rack 106 arriving at the normal disengaged position, switch 190 is closed energizing the "Index Complete" indicator lamp 200, and also energizing relay coil D. The energizing of relay coil D closes contacts D–1 completing the circuit to the template drive unit 194 and allowing the program control to continue the operative cycle and move the slide 26 in accordance with the next programmed machining operation.

By the use of the apparatus described, identical sets of tools may be provided for each work spindle of a multiple spindle machine tool and mounted in a manner which reliably, accurately and simultaneously positions corresponding tools for performing identical machining operations simultaneously on workpieces supported at each spindle. As each tool is performing its scheduled machining operation, all of the non-operating tools are positioned by the turret heads out of possible interference with the operating tools, workpieces, or supporting fixtures, thereby precluding damage to the machine or injury to a machine attendant which would otherwise result should interference occur. The apparatus described for accomplishing the multiple turret head indexing cycle includes a safety feature in that the movable member mounting the turret heads is maintained in a stationary position once an indexing cycle has commenced and continuing unless and until the indexing operation is properly completed. This desirable result is achieved by employing a single rack member for indexing all of the turret heads, thereby insuring that the turret heads are indexed in unison, and further employing the rack as the actuating element for associated control components to control the subsequent indexing procedure and continued operation of the machine tool. After an indexing cycle has commenced, the rack is positively maintained in a position which, by virtue of the associated controls, prevents the continued operation of the machine tool unless the turret heads are properly indexed and securely locked so as to insure against severe damage to or wrecking of the machine due to improperly positioned tools. It will be readily apparent, therefore, that the turret head indexing apparatus described is particularly suited for use with multiple spindle machine tools designed for automatic operation at high speeds which require simultaneous positioning of the various tools in a reliable and safe manner without the need for constant surveillance and manual control.

While in the embodiment described, the principles of the invention have been applied to a turning machine having two work-supporting spindles, it is to be understood that the invention can be employed with equal facility and with the same advantages in a machine having a greater number of work spindles, with the slide supporting a turret head for each work spindle.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. An indexable turret head apparatus mounted on a movable slide of a machine tool having a plurality of work holding spindles comprising a turret head for each work holding spindle adapted to be rotatably indexed from station to station, a head support secured to said slide rotatably mounting each said turret head, cooperatively engageable locking means on said head and said support for locking said head to said support at each index station, means connected to said head for axially moving said head relative to said support to disengage said locking means and permit said head to be rotatably indexed, a reciprocably and oscillatably movable rack, gear means connected to each said turret head engageable with said rack for rotatably indexing said turret head, means biasing said rack to a normally unmeshed position relative to said gear means, first hydraulic piston means operably connected to said locking means and normally maintaining said locking means in engaged relation, second hydraulic piston means operably connected to said rack and normally maintaining said rack in a predetermined longitudinal position relative to said gear means, indexing control means for oscillatably moving said rack into meshing engagement with said gear means, valve means operable by said rack when moved into meshing engagement with said gear means for connecting said first and second hydraulic piston means to a source of pressurized fluid to respectively disengage said locking means and reciprocably move said rack to rotatably index said turret heads in unison between adjacent stations, and means for maintaining said rack in meshing engagement with said gear means until said turret heads are fully indexed from one station to the adjacent station.

2. The turret head apparatus set forth in claim 1 wherein said machine tool includes program control means for controlling the movement of said slide along a plurality of intersecting axes in accordance with a predetermined program and additionally including sensing means operably connected to said program control means for preventing movement of said slide during the indexing of said turret heads.

3. The turret head apparatus set forth in claim 2 wherein said program control means comprises rotatable composite template means having components for controlling the movement of said slide along each axis of movement thereof, and electric drive means for rotating the components of said composite template means in unison.

4. The turret head apparatus set forth in claim 3 wherein said sensing means includes first switch means operable by said rack for interrupting the power flow to said electric drive means at the commencement of an indexing cycle and maintaining said power interruption until said rack is returned to said predetermined longitudinal position relative to and disengaged from said gear means.

5. The turret head apparatus set forth in claim 4 wherein said sensing means additionally includes second switch means operable by said first hydraulic piston means for interrupting the power flow to said drive means upon the commencement of the disengagement of said locking means and maintaining said power interruption until said locking means is engaged.

6. The turret head apparatus set forth in claim 1 additionally including an oscillatable member extending through each of said supports and connected to the turret head supported thereon, means connected to said member and said support for moving said member and the turret head connected thereto axially inwardly and outwardly of said support to respectively engage and disengage said locking means as said member is oscillated, said last mentioned means including toggle means for forcibly maintaining the locked relation of said locking means in the engaged position.

7. The turret head apparatus set forth in claim 6 wherein said first hydraulic piston means includes rod means engaging against said oscillatable members for moving all of said members in unison to engage and disengage all of said locking means of said turret heads in unison.

8. The turret head apparatus set forth in claim 1 wherein said means for maintaining said rack in meshing engagement with said gear means comprises a pin secured to said slide and a slot in said rack adapted to slidingly receive said pin therein, said slot having an end disposed in position to receive said pin upon oscillation of said rack into driving engagement with said gear means, another end disposed in position to permit the exit of said pin from said slot upon oscillation of said rack out of driving engagement with said gear means after said rack has been reciprocated to fully index said turret heads, and a portion intermediate said ends cooperatively acting with said pin to maintain said rack in driving engagement with said gear means during the reciprocal indexing movement of said rack.

9. The turret head apparatus set forth in claim 8 wherein said valve means includes a valve member engageable by said rack when the rack is moved into meshing engagement with said gear means, and said valve member includes means for permitting limited movement of the valve member relative to said rack immediately upon said turret heads arriving at an index station to disconnect said first and second hydraulic piston means from said source of pressurized fluid and simultaneously preventing reciprocal movement of said rack back to said predetermined longitudinal position.

10. The turret head apparatus set forth in claim 9 wherein said indexing control means comprises third hydraulic piston means having a rod in engagement with said rack, a control valve for intermittently connecting said third hydraulic piston means to a source of pressurized fluid to move said rod and thereby said rack against said biasing means into meshing engagement with said gear means, and means operably connected to said control valve for disconnecting said third hydraulic piston means from said source of pressurized fluid when said locking means is returned to the engaged relation following the indexing of said turret heads.

No references cited.

HARRISON L. HINSON, *Primary Examiner.*